(12) United States Patent
Jiang

(10) Patent No.: US 11,989,478 B2
(45) Date of Patent: May 21, 2024

(54) SPLICING SCREEN IMAGE DISPLAY METHOD COMPRISING ADDING FRAME DISPLAY AREAS TO OUTER EDGES OF A SOURCE IMAGE AND RELATED APPARATUS

(71) Applicant: TCL China Star Optoelectronics Technology Co., Ltd., Shenzhen (CN)

(72) Inventor: Tingting Jiang, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/618,513

(22) PCT Filed: Nov. 24, 2021

(86) PCT No.: PCT/CN2021/132927
§ 371 (c)(1),
(2) Date: Dec. 13, 2021

(87) PCT Pub. No.: WO2023/082339
PCT Pub. Date: May 19, 2023

(65) Prior Publication Data
US 2024/0036796 A1 Feb. 1, 2024

(30) Foreign Application Priority Data
Nov. 10, 2021 (CN) ............................ 202111324911.6

(51) Int. Cl.
*G06F 3/14* (2006.01)
*G02F 1/1333* (2006.01)
(52) U.S. Cl.
CPC ........ *G06F 3/1446* (2013.01); *G02F 1/13336* (2013.01)
(58) Field of Classification Search
CPC .................................................. G02B 6/2558
See application file for complete search history.

(56) References Cited

U.S. PATENT DOCUMENTS

| 2009/0096711 A1* | 4/2009 | Jang ...................... G06F 3/1446 345/1.3 |
| 2014/0184472 A1 | 7/2014 | Xia |

(Continued)

FOREIGN PATENT DOCUMENTS

| CN | 104851373 A | 8/2015 |
| CN | 106373493 A | 2/2017 |

(Continued)

OTHER PUBLICATIONS

International Search Report in International application No. PCT/CN2021/132927, dated Jun. 27, 2022.

(Continued)

*Primary Examiner* — Paul C Lee
(74) *Attorney, Agent, or Firm* — Menachem Nathan; Nathan & Associates

(57) ABSTRACT

A splicing screen image display method, a related apparatus and a storage medium are provided. The method includes: obtaining a source image and resolution information of the splicing screen device, wherein the resolution information includes pixel widths of supplementary display modules, and the pixel widths are pixel sizes of the supplementary display modules in a width direction of a seam; adding frame display areas to outer edges of the source image, to form a target image corresponding to a resolution of the splicing screen device. The frame display areas are parallel to the seam, and a sum of pixel widths of the frame display areas that are parallel to each other is equal to a sum of the pixel widths of the supplementary display modules that are parallel to each other; and sending the target image to basic display modules and supplementary display modules, to display the target image.

20 Claims, 8 Drawing Sheets

(56) References Cited

U.S. PATENT DOCUMENTS

| | | | |
|---|---|---|---|
| 2015/0022424 A1 | 1/2015 | Jepsen | |
| 2018/0173036 A1 | 6/2018 | Kim | |
| 2018/0315355 A1 | 11/2018 | Hu et al. | |
| 2019/0310517 A1* | 10/2019 | Qu | ............ G02F 1/133606 |

FOREIGN PATENT DOCUMENTS

| | | | | |
|---|---|---|---|---|
| CN | 107589578 A | * | 1/2018 | ........... G02F 1/1333 |
| CN | 110097831 A | | 8/2019 | |
| CN | 110456552 A | * | 11/2019 | |
| CN | 111506284 A | | 8/2020 | |
| JP | 2017097120 A | | 6/2017 | |
| KR | 20210032857 A | | 3/2021 | |
| WO | 2020215861 A1 | | 10/2020 | |

OTHER PUBLICATIONS

Written Opinion of the International Search Authority in International application No. PCT/CN2021/132927, dated Jun. 27, 2022.
Chinese Office Action issued in corresponding Chinese Patent Application No. 202111324911.6 dated Feb. 1, 2024, pp. 1-8.

* cited by examiner

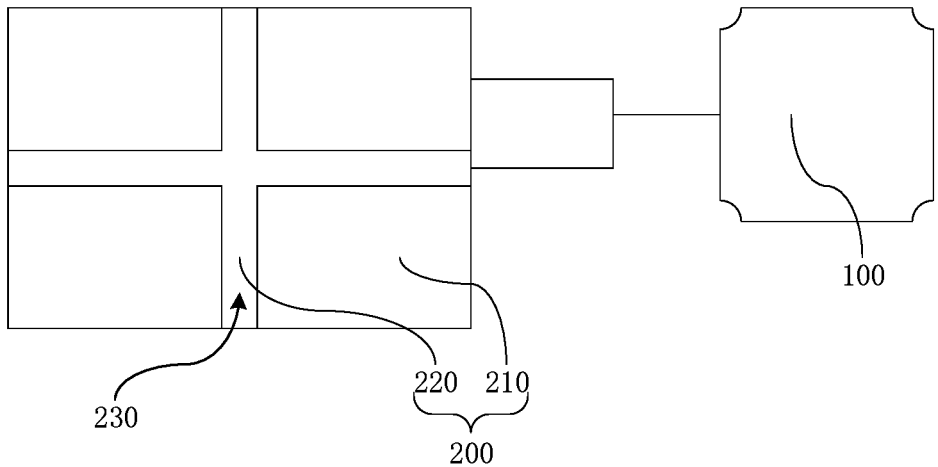

FIG. 1

```
┌─────────────────────────────────────────┐
│ Obtain a source image and resolution    │
│ information of a splicing screen        │
│ device, wherein the resolution          │
│ information includes pixel widths of    │
│ supplementary display modules, and      │
│ the pixel widths are pixel sizes of the │
│ supplementary display modules in a      │
│ width direction of a seam               │
└─────────────────────────────────────────┘
                    │
                    ▼  S100
┌─────────────────────────────────────────┐
│ Add frame display areas to outer edges  │
│ of the source image, to form a target   │
│ image corresponding to a resolution of  │
│ the splicing screen device, wherein the │
│ frame display areas are parallel to the │
│ seam, and a sum of pixel widths of the  │
│ frame display areas that are parallel   │
│ to each other is equal to a sum of the  │
│ pixel widths of the supplementary       │
│ display modules that are parallel to    │
│ each other                              │
└─────────────────────────────────────────┘
                    │
                    ▼  S200
┌─────────────────────────────────────────┐
│ Send the target image to basic display  │
│ modules and the supplementary display   │
│ modules, to display the target image    │
└─────────────────────────────────────────┘
                    │
                    ▼  S300
```

FIG. 2

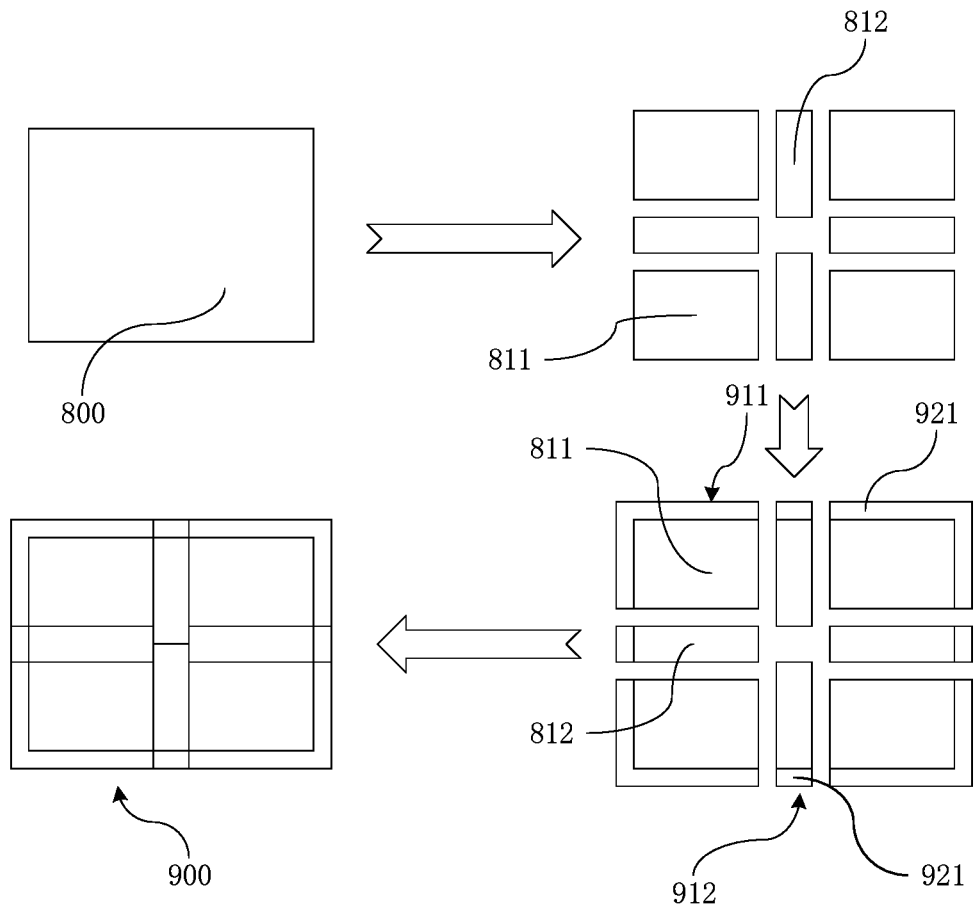

FIG. 6

```
Segment the source image into a plurality of initial basic
sub-images according to resolutions of the basic display
modules
```
↓ S211

```
Crop the initial basic sub-images, to form a
supplementary display sub-image close to the seam and a
basic display sub-image away from the seam, wherein a
pixel width of the supplementary display sub-image is
not greater than the pixel width of the supplementary
display module, and the supplementary display
sub-image and the basic display sub-image jointly form
the display sub-image
```
S212

FIG. 7

SPLICING SCREEN IMAGE DISPLAY METHOD COMPRISING ADDING FRAME DISPLAY AREAS TO OUTER EDGES OF A SOURCE IMAGE AND RELATED APPARATUS

FIELD OF INVENTION

The present disclosure relates to the field of display, and specifically, to a splicing screen image display method and a related apparatus.

BACKGROUND OF INVENTION

With the development of the electronics industry, the demand for various huge display devices is growing, and the huge display devices are increasingly widely applied to various scenarios. Therefore, the splicing screen device such as the liquid crystal display (LCD) splicing screen device has received more attention. The splicing screen device can splice a plurality of LCD screens according to actual display requirements, to form a huge display screen for image display, and has the advantages of clear image display and high flexibility.

At present, due to the requirements of the driving circuit and the production process, on the existing LCD screen, a frame with a certain width requires to be reserved at the periphery of the display area to accommodate components, such as the driving circuit. However, when a plurality of existing LCD screens are spliced to form a splicing screen device, seams are formed between the frames of adjacent LCD screens. As a result, the continuity and integrity of the display quality of the splicing screen device is destroyed, and the display effect of the splicing screen device is reduced. To cover the seam, currently, the mainstream solution is to cover the seam with a supplementary light bar for image display. The supplementary light bar displays an image with pixels adjacent to the supplementary light bar in the LCD screen, which resolves the continuity of the display quality of the splicing screen device to some extent. However, there is still a sense of fragmentation in the image at the seam of the splicing screen device, resulting in insufficiency in integrity of a display image and a poor display effect.

SUMMARY OF INVENTION

Technical Problem

Embodiments of the present disclosure provide a splicing screen image display method, a related apparatus, and a storage medium, which can resolve the technical problem in the related art that there is still a sense of fragmentation in an image at a seam of a splicing screen device, resulting in insufficiency in integrity of a display image and a poor display effect.

Technical Solution

The embodiments of the present disclosure provide a splicing screen image display method, applicable to a splicing screen device, wherein the splicing screen device includes a plurality of display modules, the plurality of display modules include at least two basic display modules and at least one supplementary display module disposed at a seam between the at least two basic display modules, and the splicing screen image display method includes: obtaining a source image and resolution information of the splicing screen device, wherein the resolution information includes pixel widths of the supplementary display modules, and the pixel widths are pixel sizes of the supplementary display modules in a width direction of the seam; adding frame display areas to outer edges of the source image, to form a target image corresponding to a resolution of the splicing screen device, wherein the frame display areas are parallel to the seam, and a sum of pixel widths of the frame display areas that are parallel to each other is equal to a sum of the pixel widths of the supplementary display modules that are parallel to each other; and sending the target image to the basic display modules and the supplementary display modules, to display the target image.

In some embodiments, the adding frame display areas to outer edges of the source image, to form a target image corresponding to a resolution of the splicing screen device further includes: segmenting the source image into a plurality of display sub-images; and adding frame display subareas to outer edges of the display sub-images located on outermost sides, to form target sub-images, wherein the frame display subareas are parallel to the seam, and a sum of pixel widths of the frame display subareas that are parallel to each other is equal to the sum of the pixel widths of the supplementary display modules that are parallel to each other, the frame display subareas jointly form the frame display area, and the target sub-images jointly form the target image.

In some embodiments, the resolution information further includes resolutions of the basic display modules, and the segmenting the source image into a plurality of display sub-images further includes: segmenting the source image into a plurality of initial basic sub-images according to the resolutions of the basic display modules; and cropping the initial basic sub-images, to form a supplementary display sub-image close to the seam and a basic display sub-image away from the seam, wherein a pixel width of the supplementary display sub-image is not greater than the pixel width of the supplementary display module, and the supplementary display sub-image and the basic display sub-image jointly form the display sub-image.

In some embodiments, the adding frame display subareas to outer edges of the display sub-images located on outermost sides, to form target sub-images further includes: adding frame display subareas along outer edges of the basic display sub-image, to form target basic sub-images, wherein the frame display subareas are parallel to the seam, and the pixel widths of the frame display subareas are equal to the pixel width of the supplementary display sub-image; and adding frame display subareas to outer edges of the supplementary display sub-image, to form target supplementary sub-images, for the target supplementary sub-images to be flush with outer edges of the basic sub-images, wherein the frame display subareas jointly form the frame display area, and the target supplementary sub-images and the target basic sub-images jointly form the target image.

In some embodiments, the resolution information further includes resolutions of the display modules, and the segmenting the source image into a plurality of display sub-images further includes: segmenting the source image into display sub-images corresponding to the display modules according to the resolutions of the display modules; and the adding frame display subareas to outer edges of the display sub-images located on outermost sides, to form target sub-images further includes: adding the frame display subareas to the outer edges of the display sub-images located on the outermost sides, to form the target sub-images corresponding to the display modules, wherein the target sub-images include a target basic sub-image corresponding to the basic display module and a target supplementary sub-image corresponding to the supplementary display module.

In some embodiments, the adding frame display areas to outer edges of the source image, to form a target image corresponding to a resolution of the splicing screen device further includes: adding the frame display areas to the outer edges of the source image, to form a matching image corresponding to the resolution of the splicing screen device, wherein the frame display areas are parallel to the seam; and segmenting the matching image into target supplementary sub-images corresponding to the supplementary display modules and target basic sub-images corresponding to the basic display modules, wherein the target supplementary sub-images and the target basic sub-images jointly form the target image.

In some embodiments, the sending the target image to the basic display modules and the supplementary display modules, to display the target image further includes: sending the target supplementary sub-images to the supplementary display modules, to display the target supplementary sub-images; and sending the target basic sub-images to the basic display modules, to display the target basic sub-images.

In some embodiments, the frame display area is used for displaying a decorative frame.

In another aspect, the present disclosure provides a splicing screen image display apparatus, installed in a splicing screen device. The splicing screen device includes a plurality of display modules, the plurality of display modules include at least two basic display modules and at least one supplementary display module disposed at a seam of the at least two basic display modules, and the splicing screen image display apparatus includes: an obtaining unit, configured to obtain a source image and resolution information of the splicing screen device, wherein the resolution information includes pixel widths of the supplementary display modules, and the pixel widths are pixel sizes of the supplementary display modules in a width direction of the seam; a processing unit, configured to add, along extension directions of the supplementary display modules, frame display areas to outer edges of the source image away from the seam, to form a target image corresponding to a resolution of the splicing screen device, wherein a sum of pixel widths of the frame display areas that are parallel to each other is equal to a sum of the pixel widths of the supplementary display modules that are parallel to each other; and a display unit, configured to send the target image to the basic display modules and the supplementary display modules, to display the target image.

In some embodiments, the processing unit is further configured to: segment the source image into a plurality of display sub-images; and add frame display subareas to outer edges of the display sub-images located on outermost sides, to form target sub-images, wherein the frame display subareas are parallel to the seam, and a sum of pixel widths of the frame display subareas that are parallel to each other is equal to the sum of the pixel widths of the supplementary display modules that are parallel to each other, the frame display subareas jointly form the frame display area, and the target sub-images jointly form the target image.

In some embodiments, the resolution information further includes resolutions of the basic display modules, and the segmenting the source image into a plurality of display sub-images further includes: segmenting the source image into a plurality of initial basic sub-images according to the resolutions of the basic display modules; and cropping the initial basic sub-images, to form a supplementary display sub-image close to the seam and a basic display sub-image away from the seam, wherein a pixel width of the supplementary display sub-image is not greater than the pixel width of the supplementary display module, and the supplementary display sub-image and the basic display sub-image jointly form the display sub-image.

In some embodiments, the adding frame display subareas to outer edges of the display sub-images located on outermost sides, to form target sub-images further includes: adding frame display subareas along outer edges of the basic display sub-image, to form target basic sub-images, wherein the frame display subareas are parallel to the seam, and the pixel widths of the frame display subareas are equal to the pixel width of the supplementary display sub-image; and adding frame display subareas to outer edges of the supplementary display sub-image, to form target supplementary sub-images, for the target supplementary sub-images to be flush with outer edges of the basic sub-images, wherein the frame display subareas jointly form the frame display area, and the target supplementary sub-images and the target basic sub-images jointly form the target image.

In some embodiments, the resolution information further includes resolutions of the display modules, and the segmenting the source image into a plurality of display sub-images further includes: segmenting the source image into display sub-images corresponding to the display modules according to the resolutions of the display modules; and the adding frame display subareas to outer edges of the display sub-images located on outermost sides, to form target sub-images further includes: adding the frame display subareas to the outer edges of the display sub-images located on the outermost sides, to form the target sub-images corresponding to the display modules, wherein the target sub-images includes a target basic sub-image corresponding to the basic display module and a target supplementary sub-image corresponding to the supplementary display module.

In some embodiments, the processing unit is further configured to: add the frame display areas to the outer edges of the source image, to form a matching image corresponding to the resolution of the splicing screen device, wherein the frame display areas are parallel to the seam; and segment the matching image into target supplementary sub-images corresponding to the supplementary display modules and target basic sub-images corresponding to the basic display modules, wherein the target supplementary sub-images and the target basic sub-images jointly form the target image.

In some embodiments, the display unit is further configured to: send the target supplementary sub-images to the supplementary display modules, to display the target supplementary sub-images; and send the target basic sub-images to the basic display modules, to display the target basic sub-images.

In another aspect, the present disclosure further provides a computer device, including: one or more processors; a memory; and one or more application programs, wherein the one or more application programs are stored in the memory and configured to be executed by the one or more processors perform steps of: obtaining a source image and resolution information of the splicing screen device, wherein the resolution information includes pixel widths of the supplementary display modules, and the pixel widths are pixel sizes of the supplementary display modules in a width direction of the seam; adding frame display areas to outer edges of the source image, to form a target image corresponding to a resolution of the splicing screen device, wherein the frame display areas are parallel to the seam, and a sum of pixel widths of the frame display areas that are parallel to each other is equal to a sum of the pixel widths of the supplementary display modules that are parallel to each other; and sending the target image to the basic display modules and the supplementary display modules, to display the target image.

In some embodiments, in the step of adding frame display areas to outer edges of the source image, to form a target image corresponding to a resolution of the splicing screen device, the processor performs steps of: segmenting the source image into a plurality of display sub-images; and adding frame display subareas to outer edges of the display sub-images located on outermost sides, to form target sub-images, wherein the frame display subareas are parallel to the seam, and a sum of pixel widths of the frame display subareas that are parallel to each other is equal to the sum of the pixel widths of the supplementary display modules that are parallel to each other, the frame display subareas jointly form the frame display area, and the target sub-images jointly form the target image.

In some embodiments, the resolution information further includes resolutions of the basic display modules, and in the step of segmenting the source image into a plurality of display sub-images, the processor performs steps of: segmenting the source image into a plurality of initial basic sub-images according to the resolutions of the basic display modules; and cropping the initial basic sub-images, to form a supplementary display sub-image close to the seam and a basic display sub-image away from the seam, wherein a pixel width of the supplementary display sub-image is not greater than the pixel width of the supplementary display module, and the supplementary display sub-image and the basic display sub-image jointly form the display sub-image.

In some embodiments, in the step of adding frame display subareas to outer edges of the display sub-images located on outermost sides, to form target sub-images, the processor performs steps of: adding frame display subareas along outer edges of the basic display sub-image, to form target basic sub-images, wherein the frame display subareas are parallel to the seam, and the pixel widths of the frame display subareas are equal to the pixel width of the supplementary display sub-image; and adding frame display subareas to outer edges of the supplementary display sub-image, to form target supplementary sub-images, for the target supplementary sub-images to be flush with outer edges of the basic sub-images, wherein the frame display subareas jointly form the frame display area, and the target supplementary sub-images and the target basic sub-images jointly form the target image.

In some embodiments, the resolution information further includes resolutions of the display modules, and in the step of segmenting the source image into a plurality of display sub-images, the processor performs steps of: segmenting the source image into display sub-images corresponding to the display modules according to the resolutions of the display modules; and the adding frame display subareas to outer edges of the display sub-images located on outermost sides, to form target sub-images further includes: adding the frame display subareas to the outer edges of the display sub-images located on the outermost sides, to form the target sub-images corresponding to the display modules, wherein the target sub-images include a target basic sub-image corresponding to the basic display module and a target supplementary sub-image corresponding to the supplementary display module.

Beneficial Effects

In the embodiments of the present disclosure, a frame display area parallel to a seam is added to an outer edge of a source image, so that the source image is converted into a target image corresponding to a resolution of a splicing screen device, and the splicing screen device displays the target image, thereby resolving the technical problem that there is still a sense of fragmentation in an image at a seam of the splicing screen device, resulting in insufficiency in integrity of a display image and a poor display effect.

BRIEF DESCRIPTION OF DRAWINGS

FIG. 1 is a diagram of an implementation environment of a splicing screen image display method according to an embodiment.

FIG. 2 is a flowchart of a splicing screen image display method according to an exemplary embodiment.

FIG. 6 is a schematic diagram of image changes in another embodiment of the splicing screen image display method according to the embodiment corresponding to FIG. 4.

FIG. 7 is a flowchart of a specific implementation of step S210 in the splicing screen image display method according to the embodiment corresponding to FIG. 4.

REFERENCE NUMERALS

Figure 3:
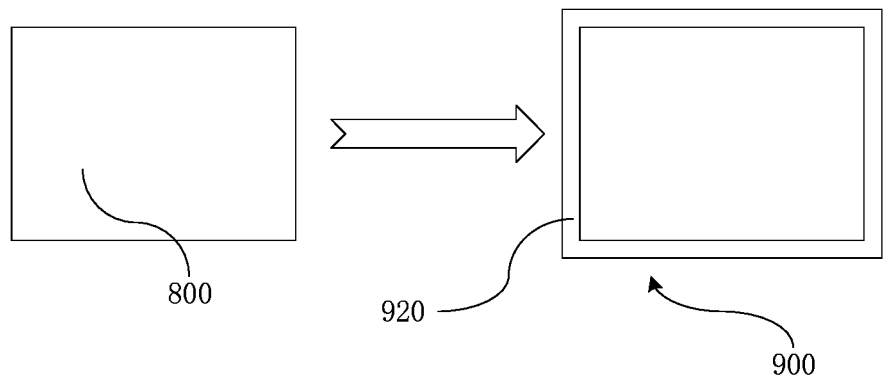
FIG. 3 is a schematic diagram of image changes in the splicing screen image display method according to the embodiment corresponding to FIG. 2.

100. control module; 200. display module; 110. obtaining unit; 120. processing unit; 130. display unit; 210. basic display module; 220. supplementary display module; 230. seam; 800. source image; 900. target image; 810. display sub-image; 910. target sub-image; 920. frame display area; 801. initial basic sub-image; 811. basic display sub-image; 812. supplementary display sub-image; 911. target basic sub-image; 912. target supplementary sub-image; and 921. frame display subarea.

DETAILED DESCRIPTION OF PREFERRED EMBODIMENTS

The following clearly and completely describes the technical solutions in the embodiments of the present disclosure with reference to the accompanying drawings in the embodiments of the present disclosure. Apparently, the described embodiments are merely some of the embodiments of the present disclosure rather than all of the embodiments. All other embodiments obtained by a person skilled in the art based on the embodiments of the present disclosure without creative efforts shall fall within the protection scope of the present disclosure. In addition, it should be understood that the specific implementations described herein are merely used to describe and explain the present disclosure, but are not intended to limit the present disclosure. In the present disclosure, without the contrary explanation, the directional terms, such as "upper" and "lower" are usually refer to the upper and lower directions of an apparatus in actual use or working state, and specifically refer to the drawing directions in the accompanying drawings, and "inside" and "outside" are in terms of an outline of the apparatus.

The embodiments of the present disclosure provide a splicing screen image display method and a related apparatus, and a storage medium. Detailed descriptions are separately provided below. It should be noted that the description sequence of the following embodiments is not intended to limit preference orders of the embodiments.

To make the objectives, technical solutions and advantages of the present invention clearer and more comprehensible, the following further describes the present invention in detail with reference to the accompanying drawings and embodiments. It should be understood that the specific embodiments described herein are merely used to explain the present invention but are not intended to limit the present invention.

FIG. 1 is a diagram of an implementation environment of a splicing screen image display method according to an embodiment. As shown in FIG. 1, the implementation environment includes a splicing screen device, which includes a control module 100 and a plurality of display modules 200.

The plurality of display modules 200 include at least two basic display modules 210 and at least one supplementary display module 220. The basic display module 210 and the supplementary display module 220 are modules that may be installed in any splicing screen device that requires a display interface, and provide a display interface for the device. The basic display module 210 and the supplementary display module 220 may be installed in various indoor and outdoor huge splicing screen devices and various other devices that require display interfaces. The supplementary display module 220 is disposed at a seam 230 between the two basic display modules 210. The control module 100 is a module configured to control display of the basic display module 210 and the supplementary display module 220, which may control various display parameters of the basic display module 210 and the supplementary display module 220, and may control images displayed by the basic display module 210 and the supplementary display module 220.

During use, after obtaining an image source, the control module 100 processes the image source, to segment the image source to be adapted to sub-images of the basic display modules 210 and the supplementary display modules 220, and sends the image source to the basic display modules 210 and the supplementary display modules 220 for display, to combine the sub-images into a complete image.

It should be noted that, the control module 100 may be connected to the basic display module 210 and the supplementary display module 220 in a wireless or wired manner, or in another communication connection manner, which is not limited in the present invention.

As shown in FIG. 2, in an embodiment, a splicing screen image display method is provided. The splicing screen image display method is applicable to the control module 100, and may specifically include steps of:

Step S100: Obtain a source image and resolution information of a splicing screen device, wherein the resolution information includes pixel widths of supplementary display modules, and the pixel widths are pixel sizes of the supplementary display modules in a width direction of a seam.

Step S200: Add frame display areas to outer edges of the source image, to form a target image corresponding to a resolution of the splicing screen device, wherein the frame display areas are parallel to the seam, and a sum of pixel widths of the frame display areas that are parallel to each other is equal to a sum of the pixel widths of the supplementary display modules that are parallel to each other.

Step S300: Send the target image 900 to basic display modules and the supplementary display modules, to display the target image 900.

In the present embodiment, referring to FIG. 3, if an image is to be displayed on a splicing screen, a corresponding source image 800 and related resolution information of a corresponding splicing screen device require to be obtained first, to pre-process an image. The resolution information may include resolution information of the display modules 200, position information of the display modules 200, pixel widths of the supplementary display modules 220, and the like. The pixel width is a pixel size of the supplementary display module 220 in a width direction of the seam 230, to help determine a pixel width that requires to be supplemented based on the source image 800, and image sizes allocated to the display modules 200, so that the finally formed target image 900 corresponds to the resolution of the splicing screen device.

After the corresponding image and the related resolution information of the corresponding splicing screen device are obtained, the pixel width that requires to be supplemented on the image and the image sizes allocated to the display modules 200 may be determined according to the related resolution information.

After the target image 900 is obtained, the target image 900 may be sent to the display modules for display.

In this embodiment of the present disclosure, a manner of making the finally formed target image 900 correspond to the resolution of the splicing screen device is to add frame display areas 920 to outer edges of the source image 800. The frame display areas 920 are parallel to the seam 230. A sum of pixel widths of the frame display areas 920 that are parallel to each other is equal to a sum of pixel widths of the supplementary display modules 220 that are parallel to each other. That is, in the present embodiment, the frame display areas 920 parallel to the seam 230 are added to the outer edges of the source image 800 according to the pixel widths of the supplementary display modules 220, to finally form the target image 900 corresponding to the resolution of the splicing screen device.

The frame display area 920 may be configured as an area displaying a decorative frame, for example, an area displayed as a frame of various colors, such as black; or may be configured as an area displaying a functional frame, for example, an area for displaying a time, a temperature, a progress bar, and the like.

Figure 5:
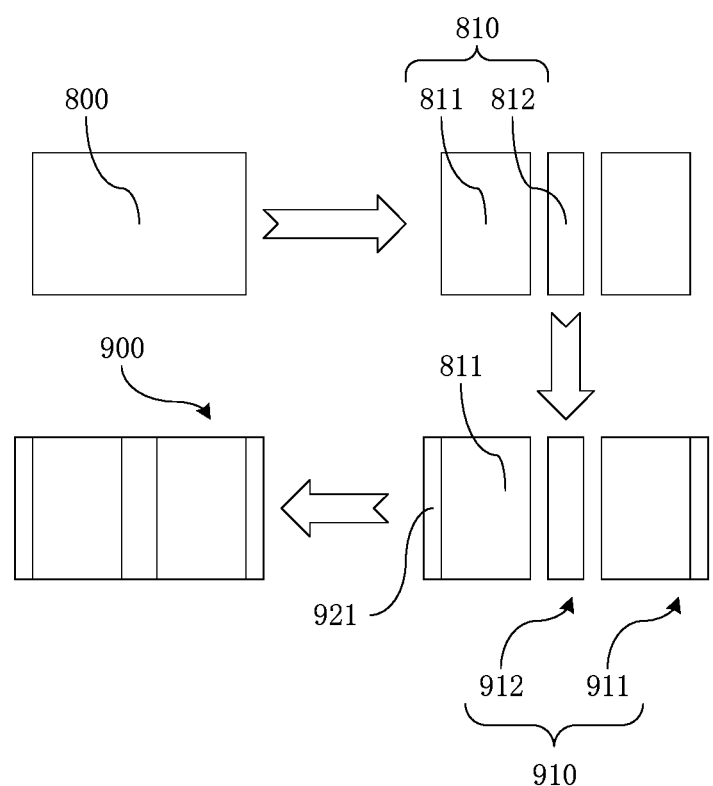
FIG. 5 is a schematic diagram of image changes in an embodiment of the splicing screen image display method according to the embodiment corresponding to FIG. 4.
Figure 9:
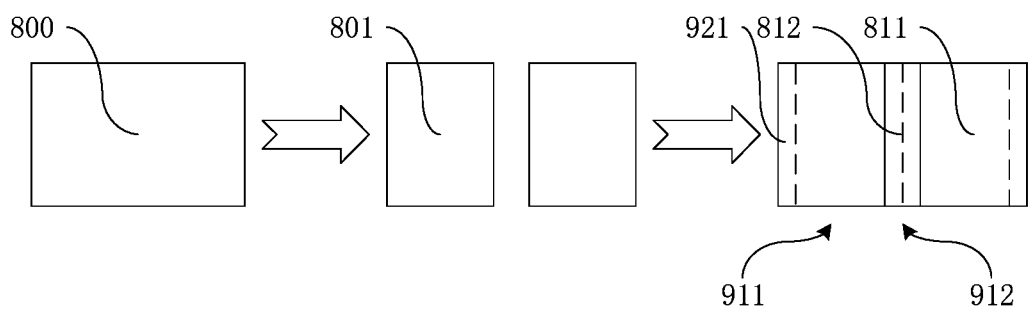
FIG. 9 is a schematic diagram of image changes in an embodiment of the splicing screen image display method according to the embodiment corresponding to FIG. 7.

As shown in FIG. 5 and FIG. 9, when the splicing screen device is a display screen formed by a plurality of basic display modules 210 arranged in a straight line, the frame display areas 920 may be disposed on an outer edge of one side of the source image 800 parallel to the seam 230, or may be disposed on outer edges of two opposite sides of the source image 800 parallel to the seam 230. When the frame display areas 920 are disposed on the outer edges of the two opposite sides of the source image 800 parallel to the seam 230, pixel widths of the frame display areas 920 on the two sides may be the same or different. When the pixel widths of the frame display areas 920 on the two sides are the same, the source image 800 is disposed in the center, providing a better visual effect. When the pixel widths of the frame display areas 920 on the two sides are different, the pixel widths of the frame display areas 920 are wider, and content that can be displayed is richer.

Figure 10:
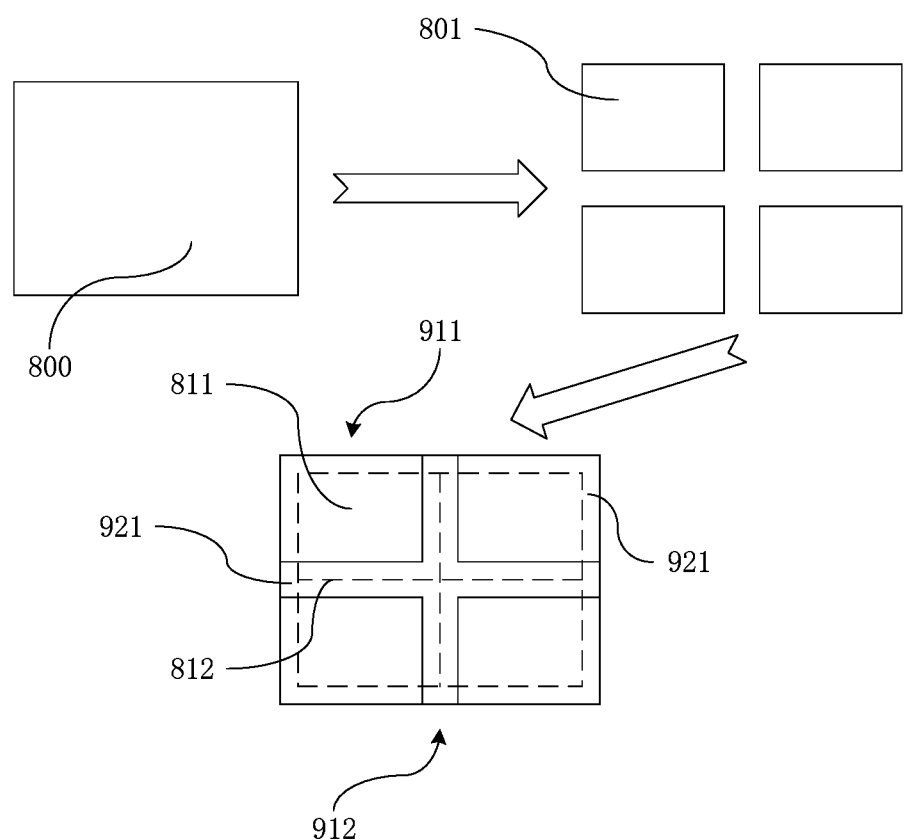
FIG. 10 is a schematic diagram of image changes in another embodiment of the splicing screen image display method according to the embodiment corresponding to FIG. 7.

As shown in FIG. 6 and FIG. 10, when the splicing screen device is a display screen formed by a plurality of basic display modules 210 arranged in a rectangular array, the frame display areas 920 may be disposed on two adjacent outer edges of the source image 800, or may be disposed on three outer edges of the source image 800, or may be disposed on all outer edges of the source image 800. In addition, when the frame display areas 920 are disposed on three or more outer edges of the source image 800, the pixel widths of the frame display areas 920 on the two opposite sides may be the same or different. When the pixel widths of the frame display areas 920 on the two sides are the same, the source image 800 is disposed in the center, providing a better visual effect. When the pixel widths of the frame display areas 920 on the two sides are different, the pixel widths of the frame display areas 920 are wider, and content that can be displayed is richer. In addition, the frame display areas 920 on the two adjacent sides of the source image 800 may be respectively configured as an area displaying a decorative frame and an area displaying a functional frame.

In addition, there are a plurality of implementations for adding the frame display areas 920 to the outer edges of the source image 800. For example, the source image 800 is segmented first, and a frame display subarea is then added to a display sub-image 810 located on an outermost side, or the source image 800 may be segmented after the frame display area 920 is added to the source image 800, which is not limited in the present disclosure, and detailed descriptions are provided in the following embodiments.

Figure 4:
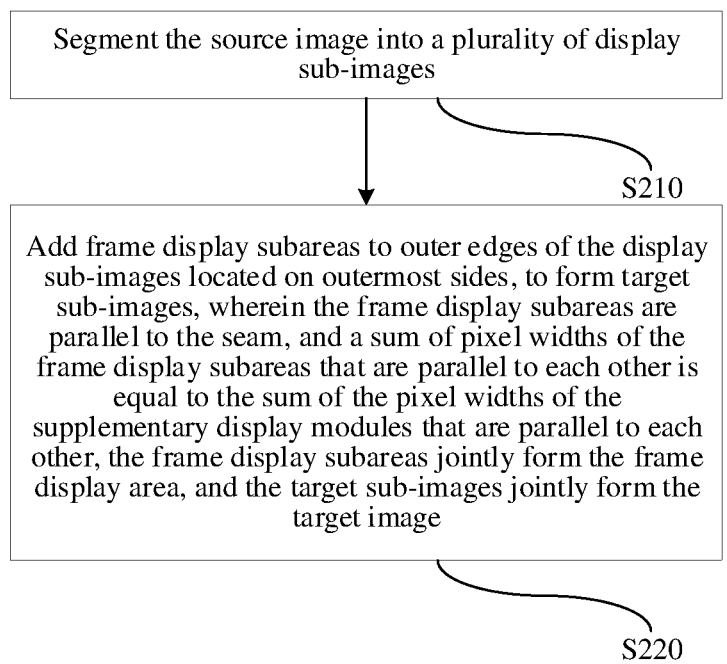
FIG. 4 is a flowchart of a specific implementation of step S200 in the splicing screen image display method according to the embodiment corresponding to FIG. 2.

Specifically, in some embodiments, for a specific implementation of step S200, reference may be made to FIG. 4. FIG. 4 is a detailed description of step S200 in the splicing screen image display method according to the embodiment corresponding to FIG. 2. In the splicing screen image display method, step S200 may include steps of: Step S210: Segment the source image into a plurality of display sub-images.

Step S220: Add frame display subareas to outer edges of the display sub-images located on outermost sides, to form target sub-images, wherein the frame display subareas are parallel to the seam, and a sum of pixel widths of the frame display subareas that are parallel to each other is equal to the sum of the pixel widths of the supplementary display modules that are parallel to each other, the frame display subareas jointly form the frame display area, and the target sub-images jointly form the target image.

In the present embodiment, referring to FIG. 5, FIG. 6, FIG. 9, and FIG. 10, the source image 800 is segmented first, and after the segmentation is completed, the step of adding the frame display areas 920 may be performed, which specifically includes adding frame display subareas 921 to outer edges of the display sub-images 810 located on outermost sides, to finally form target sub-images 910 corresponding to resolutions of the display modules 200, and the target sub-images 910 jointly form the target image 900.

Detailed descriptions are provided below with reference to specific implementations.

Implementation 1:

Still referring to FIG. 5 and FIG. 6, this implementation has fewer limiting conditions and is applicable to splicing screen devices of various layout types. In this implementation, the source image 800 is segmented first according to the resolutions and positions of the display modules 200, wherein resolutions of the display sub-images 810 allocated to the display modules 200 on inner sides are same as the resolutions of the display modules 200, and resolutions of the display sub-images 810 allocated to the display modules 200 on outer sides are less than the resolutions of the display modules 200. Then, the frame display subareas 921 are added to the outer edges of the display sub-images 810 located on the outer sides.

In this implementation, the resolution information further includes resolutions of the display modules, and step S210 specifically includes: segmenting the source image into display sub-images corresponding to the display modules according to the resolutions of the display modules.

Step S220 specifically includes steps of:
adding the frame display subareas to the outer edges of the display sub-images located on the outermost sides, to form the target sub-images corresponding to the display modules, wherein
the target sub-images include a target basic sub-image corresponding to the basic display module and a target supplementary sub-image corresponding to the supplementary display module.

When the splicing screen device is a display screen formed by a plurality of basic display modules 210 arranged in a straight line, the display modules 200 located on the outer sides are basic display modules 210 located on two ends of the splicing screen, and the display modules 200 located on the inner sides are the basic display module 210 and the supplementary display module 220 located between the two basic display modules 210.

When the splicing screen device is a display screen formed by a plurality of basic display modules 210 arranged in a rectangular array, the display modules 200 located on the outer sides are display modules 200 around outer sides of the splicing screen, and the display modules 200 located on the inner sides are basic display modules 200 located on the inner sides of the display modules 200. Specifically, when the plurality of basic display modules 210 are arranged in the rectangular array, an arrangement state of the rectangular array is an m×n matrix, wherein m represents the number of basic display modules 210 in a transverse direction, and n represents the number of basic display modules 210 in a longitudinal direction. When m is 2 and n is 2, all display modules 200 are display modules 200 located on the outer sides. When any one of m and n is greater than 2, at least one supplementary display module 220 located on the inner side is included.

The resolutions of the display sub-images 810 allocated to the display modules 200 on the outer sides are less than the resolutions of the display modules 200. Therefore, after the segmentation is completed, a corresponding frame display subarea 921 requires to be added to the outer edges of the display sub-images 810 on the outer sides according to pixel widths lacked in the display sub-images 810, to form the target sub-images 910.

The display sub-images 810 include a basic display sub-image 811 corresponding to the basic display module 210 and a supplementary display sub-image 812 corresponding to the supplementary display module 220. The target sub-images 910 include a target basic sub-image 911 corresponding to the basic display module 210 and a target supplementary sub-image 912 corresponding to the supplementary display module 220.

Figure 8:
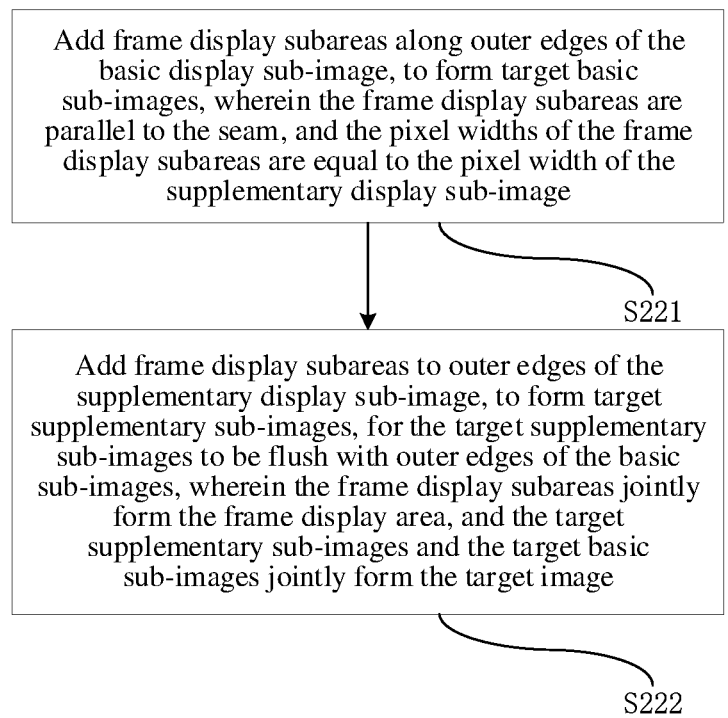
FIG. 8 is a flowchart of a specific implementation of step S220 in the splicing screen image display method according to the embodiment corresponding to FIG. 7.

Implementation 2:

Still referring to FIG. 9 and FIG. 10, for detailed flowcharts of this implementation, reference may be made to FIG. 7 and FIG. 8. This implementation is only applicable to a case that four basic display modules 210 are arranged in an array, and to a case that two basic display modules 210 are spliced. In this implementation, the source image 800 is segmented first according to the resolutions and positions of the basic display modules 210, a corresponding image displayed for the supplementary display module is then cropped based on the segmented image, and a frame display area 920 is added on the other opposite side for supplement according to a resolution of the cropped image. For a specific embodiment, reference may be made to the embodiment shown in FIG. 7.

FIG. 7 is a detailed description of step S210 in the splicing screen image display method according to the embodiment corresponding to FIG. 4. In the splicing screen image display method, the resolution information further includes resolutions of the basic display modules, and step S210 may include steps of:

Step S211: Segment the source image 800 into a plurality of initial basic sub-images according to the resolutions of the basic display modules.

Step S212: Crop the initial basic sub-images, to form a supplementary display sub-image close to the seam and a basic display sub-image away from the seam, wherein a pixel width of the supplementary display sub-image is not greater than the pixel width of the supplementary display module, and the supplementary display sub-image and the basic display sub-image jointly form the display sub-image.

In the present embodiment, still referring to FIG. 9 and FIG. 10, a specific manner of segmenting the source image 800 is to first segment the source image 800 into a plurality of initial basic sub-images 801 according to the resolutions of the basic display modules, and cropping is then performed based on the initial basic sub-image 801, to obtain a supplementary display sub-image 812 close to the seam 230 and a basic display sub-image 811 away from the seam 230. During cropping, only initial basic sub-images 801 corresponding to the basic display modules 210 located on the same side of the seam 230 may be cropped, or initial basic sub-images 801 corresponding to the basic display modules 210 located on two sides of the seam 230 may be simultaneously cropped, which is not limited in the present disclosure.

Because one supplementary display module is adjacent to two basic display modules, that is, an image of one supplementary display module may be cropped from an image of an adjacent basic display module, or may be cropped from screens of the two adjacent basic display modules. When the image of the supplementary display module is cropped from the images of the two adjacent basic display modules, a cropped supplementary display sub-image 812 requires to be spliced with a supplementary display sub-image 812 cropped from the other image. Therefore, the pixel width of the supplementary display sub-image 812 is not greater than the pixel width of the supplementary display module.

The foregoing cropping manner is only applicable to a case that four basic display modules 210 are arranged in an array, and to a case that two basic display modules 210 are spliced.

After the segmentation is completed, the frame display area 920 is added on the other opposite side for supplement according to a resolution of the cropped image. For a specific embodiment, reference may be made to the embodiment shown in FIG. 8.

FIG. 8 is a detailed description of step S220 in the splicing screen image display method according to the embodiment corresponding to FIG. 4. In the splicing screen image display method, step S220 may include steps of:

Step S221: Add frame display subareas along outer edges of the basic display sub-image, to form target basic sub-images, wherein the frame display subareas are parallel to the seam, and the pixel widths of the frame display subareas are equal to the pixel width of the supplementary display sub-image.

Step S222: Add frame display subareas to outer edges of the supplementary display sub-image, to form target supplementary sub-images, for the target supplementary sub-images to be flush with outer edges of the basic sub-images, wherein the frame display subareas jointly form the frame display area, and the target supplementary sub-images and the target basic sub-images jointly form the target image.

In the present embodiment, still referring to FIG. 9 and FIG. 10, a manner of adding the frame display subarea 921 based on the display sub-image 810 is to add the frame display subarea 921 on the other opposite side of the display sub-image 810 according to a resolution of the cropped supplementary display sub-image 812 in step S212, to form a target basic sub-image 911. A resolution of the newly added frame display area 920 is same as the resolution of the cropped supplementary display sub-image 812 in step S212, so that a resolution of the target basic sub-image 911 matches a resolution of a corresponding basic display module.

In addition, when the method is applied to a splicing screen device in which four basic display modules 210 are arranged in a rectangular array, the frame display area 920 also requires to be correspondingly added to an image displayed by the supplementary display module 220. In this case, a frame display subarea 921 is added to an outer edge of the supplementary display sub-image 812 to form a target supplementary sub-image 912. A pixel width of the frame display subarea 921 is equal to a pixel width of a frame display subarea 921 on the same side, so as to ensure that the target supplementary sub-image 912 is flush with an outer edge of the basic sub-image, and further ensure that a resolution of the target supplementary sub-image 912 matches a resolution of a corresponding supplementary display module 220.

The foregoing implementations are all implementations of the embodiment shown in FIG. 4 of the present disclosure.

In addition, in some other embodiments of the present disclosure, different from the embodiment shown in FIG. 4, a manner of forming the target image 900 corresponding to the resolution of the splicing screen device in step S200 may alternatively be that the frame display areas 920 are added first to an unsegmented source image 800 before the source image 800 is segmented. For a specific implementation, reference may be made to the embodiment shown in FIG. 11.

Figure 11:
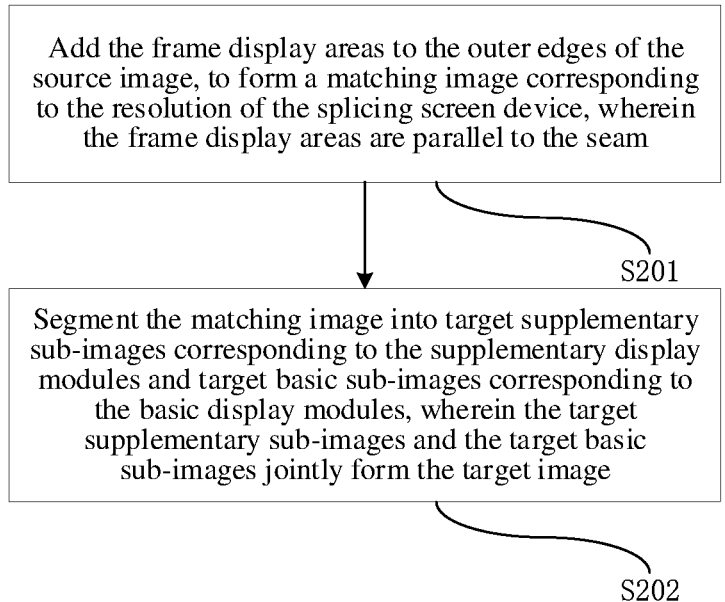
FIG. 11 is a flowchart of another specific implementation of step S200 in the splicing screen image display method according to the embodiment corresponding to FIG. 2.

Specifically, in some other embodiments, for a specific implementation of step S200, reference may be made to FIG. 11. FIG. 11 is a detailed description of step S200 in the splicing screen image display method according to the embodiment corresponding to FIG. 2. In the splicing screen image display method, step S200 may include steps of:

Step S201: Add the frame display areas 920 to the outer edges of the source image 800, to form a matching image corresponding to the resolution of the splicing screen device, wherein the frame display areas 920 are parallel to the seam.

Step S202: Segment the matching image into target supplementary sub-images 912 corresponding to the supplementary display modules and target basic sub-images 911 corresponding to the basic display modules, wherein the target supplementary sub-images 912 and the target basic sub-images 911 jointly form the target image 900.

In the present embodiment, the frame display areas 920 are added first to the periphery of the unsegmented source image 800 according to the resolution information of the entire splicing screen device, to form the matching image corresponding to the resolution of the splicing screen device, and the matching image is then segmented according to the resolutions and positions of the display modules 200, to obtain the target supplementary sub-images 912 corresponding to the supplementary display modules 220 and the target basic sub-images 911 corresponding to the basic display modules 210.

In this implementation, the frame display areas 920 are added first to the unsegmented source image 800 before the source image 800 is segmented. Compared with adding the frame display areas 920 after the source image 800 is segmented, the added frame display areas 920 has a better overall effect, and the image is more easily to be segmented. The screen only requires to be segmented according to the resolutions and positions of the display modules 200. In contrast, a calculation amount is smaller. In addition, the method has a wide application range, and is applicable to splicing screen devices of various forms, including a splicing screen device in which a display screen is formed by a plurality of basic display modules 210 arranged in a straight line, and a splicing screen device in which a display screen is formed by a plurality of basic display modules 210 arranged in a rectangular array.

Figure 12:
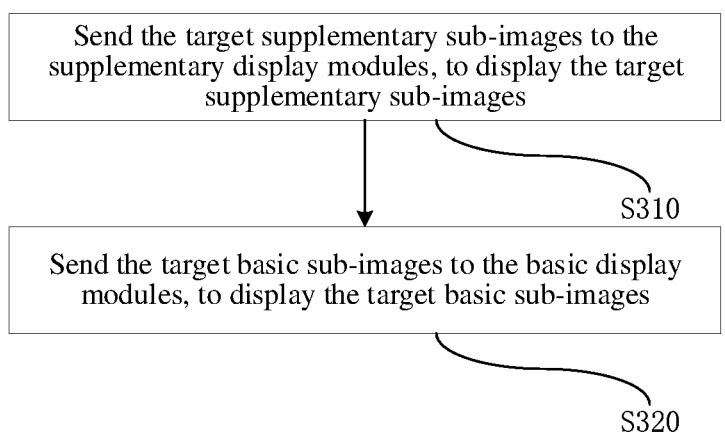
FIG. 12 is a flowchart of a specific implementation of step S300 in the splicing screen image display method according to the embodiment corresponding to FIG. 2.

Specifically, in some embodiments, for a specific implementation of step S300, reference may be made to FIG. 12. FIG. 12 is a detailed description of step S300 in the splicing screen image display method according to the embodiment corresponding to FIG. 8 or FIG. 11. In the splicing screen image display method, step S300 may include steps of:

Step S310: Send the target supplementary sub-images 912 to the supplementary display modules, to display the target supplementary sub-images 912.

Step S320: Send the target basic sub-images 911 to the basic display modules, to display the target basic sub-images 911.

After the target image 900 is obtained, the target image 900 may be sent to the display modules for display. A specific manner is to send the target supplementary sub-images 912 to the corresponding supplementary display modules 220 for display, and send the target basic sub-images 911 to the corresponding basic display modules 210 for display. The target supplementary sub-images 912 and the target basic sub-images 911 jointly form a complete target image 900.

In the foregoing embodiment, the frame display area 920 may be used for displaying a decorative frame. The decorative frame may be a decorative frame of black, white, gray, and various other colors, and is generally a black decorative frame to blend into a black environment of a peripheral panel. In another embodiment, the color of the decorative frame may alternatively be consistent with a theme color of a displayed image, or may be copied from the color of adjacent pixels of the decorative frame, to blend into the entire image to avoid an excessively wide black frame.

In addition, in other embodiments of the present disclosure, the frame display area 920 may alternatively be used for displaying a functional frame. The functional frame may display important information, such as a subtitle, a time, and a temperature, to avoid a waste of a display area and improve a screen-to-body ratio of a splicing screen.

For example, in an embodiment of the present disclosure, the frame display area 920 is used for displaying a current time. When the frame display area 920 is only disposed on one side of the source image 800, a display form of the frame display area 920 may be that different times are represented according to lengths of lighted color blocks, or different times are represented according to positions of displayed color blocks. When the frame display areas 920 are disposed around the source image 800, a display form of the frame display areas 920 may be same as that of an ordinary clock, respectively with an hour hand point that is displayed on an inner side of the frame display area 920 and that represents an hour hand, and a minute hand point that is displayed on an outer side of the frame display area 920 and that represents a minute hand. The current time is displayed by a combination of the hour hand point and the minute hand point.

In some other embodiments of the present disclosure, the frame display area 920 is used for displaying current weather conditions, specifically including a current weather type, a natural disaster level, a current temperature, current precipitation, and the like.

When the frame display area 920 is only disposed on one side of the source image 800, a display form of the frame display area 920 may be that different weather types and natural disaster types are represented according to different block colors, and the temperature, the natural disaster level, and the current precipitation are represented according to lengths of lighted color blocks.

Figure 13:
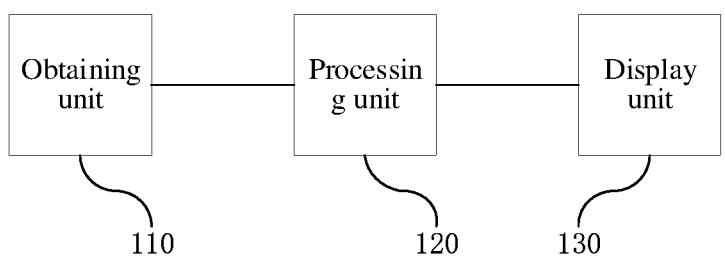
FIG. 13 is a block diagram of a splicing screen image display apparatus according to an exemplary embodiment.

As shown in FIG. 13, in an embodiment, a splicing screen image display apparatus is provided. The splicing screen image display apparatus may be integrated in the control module 100, and may specifically include an obtaining unit 110, a processing unit 120, and a display unit 130.

The obtaining unit 110 is configured to obtain a source image and resolution information of the splicing screen device, wherein the resolution information includes pixel widths of supplementary display modules, and the pixel widths are pixel sizes of the supplementary display modules in a width direction of a seam.

The processing unit 120 is configured to add frame display areas to outer edges of the source image, to form a target image corresponding to a resolution of the splicing screen device, wherein the frame display areas are parallel to the seam, and a sum of pixel widths of the frame display areas that are parallel to each other is equal to a sum of the pixel widths of the supplementary display modules that are parallel to each other.

The display unit 130 is configured to send the target image to basic display modules and the supplementary display modules, to display the target image.

For details about the implementation processes of the functions and effects of the modules in the foregoing apparatus, refer to the implementation processes of the corresponding steps in the splicing screen image display method. Details are not described herein again.

Although several modules or units of a device for action execution are mentioned in the foregoing detailed descriptions, the division is not mandatory. In practice, according to the implementations of the present disclosure, the features and functions of two or more modules or units described above may be embodied in one module or unit. Conversely, the features and functions of one module or unit described above may be further divided into a plurality of modules or units to be embodied.

In addition, although the steps of the method in the present disclosure are described in the accompanying drawings in a specific sequence, this does not require or imply that these steps need to be performed according to the specific sequence, or all shown steps need to be performed to achieve an expected result. Additionally or alternatively, some steps may be omitted, a plurality of steps may be combined into one step for execution, and/or one step may be decomposed into a plurality of steps for execution, and the like.

Through descriptions of the foregoing implementations, it is easy for a person skilled in the art to understand that the exemplary implementations described herein can be implemented by software or by combining software with necessary hardware. Therefore, the technical solutions of the implementations of the present disclosure may be implemented in the form of a software product. The software product may be stored in a non-volatile storage medium (which may be a compact disc read-only memory (CD-ROM), a USB flash drive, a removable hard disk, or the like) or a network and includes several instructions for instructing a computing device (which may be a personal computer, a server, a mobile terminal, a network device, or the like) to perform the method described in the implementations of the present disclosure.

An exemplary embodiment of the present disclosure further provides an electronic device that can implement the foregoing method.

It may be understood by a person skilled in the art that each aspect of the present invention may be implemented as a system, a method, or a program product. Therefore, each aspect of the present invention may be specifically implemented in the following manners, that is, a hardware-only implementation, a software-only implementation (including firmware, microcode, and the like), or an implementation combining hardware and software, which can be collectively referred to as a "circuit", "module" or "system" herein.

An electronic device 500 according to this implementation of the present invention is described below with reference to FIG. 14. The electronic device 500 shown in FIG. 14 is only an example, and should not impose any limitation on the functions and scope of use of the embodiments of the present invention.

Figure 14:
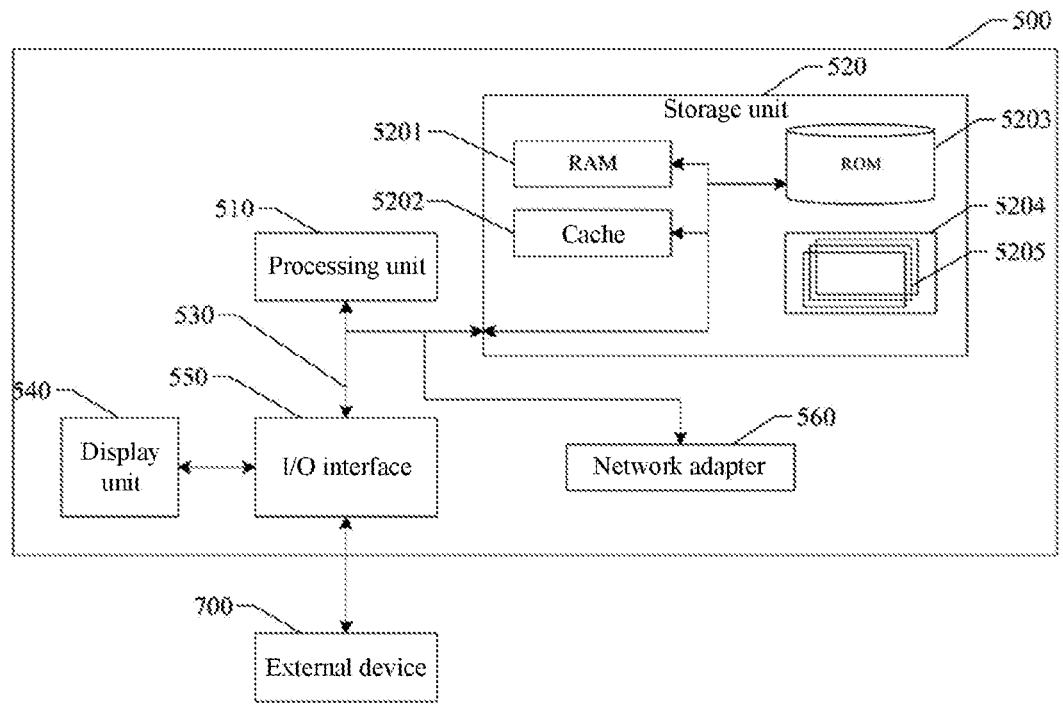
FIG. 14 schematically shows a block diagram of an example of an electronic device for implementing the splicing screen image display method.

As shown in FIG. 14, the electronic device 500 is represented in the form of a general-purpose computing device. Components of the electronic device 500 may include, but are not limited to: at least one processing unit 510, at least one storage unit 520, and a bus 530 connecting different system components (including the storage unit 520 and the processing unit 510).

The storage unit stores program code, and the program code may be executed by the processing unit 510, so that the processing unit 510 performs the steps according to the exemplary implementations of the present invention described in the foregoing "exemplary method" part of this specification. For example, the processing unit 510 may perform the steps shown in FIG. 2. Step S100: Obtain a source image and resolution information of a splicing screen device, wherein the resolution information includes pixel widths of supplementary display modules, and the pixel widths are pixel sizes of the supplementary display modules in a width direction of a seam. Step S200: Add frame display areas to outer edges of the source image, to form a target image corresponding to a resolution of the splicing screen device, wherein the frame display areas are parallel to the seam, and a sum of pixel widths of the frame display areas that are parallel to each other is equal to a sum of the pixel widths of the supplementary display modules that are parallel to each other. Step S300: Send the target image to the basic display modules and the supplementary display modules, to display the target image.

The storage unit 520 may include a readable medium in the form of a volatile storage unit, for example, a random access memory (RAM) unit 5201 and/or a cache storage unit 5202, and may further include a read-only memory (ROM) unit 5203.

The storage unit 520 may further include a program/utility 5204 having a set of (at least one) program modules 5205. Such a program module 5205 includes, but is not limited to, an operating system, one or more application programs, other program modules, and program data. Each or a combination of these examples may include implementation of a network environment.

The bus 530 may indicate one or more of several types of bus structures, including a storage unit bus or storage unit controller, a peripheral bus, an accelerated graphics port, a processing unit, or a local bus using any of a plurality of bus structures.

The electronic device 500 may also communicate with one or more external devices 700 (such as a keyboard, a pointing device, and a Bluetooth device), and may also communicate with one or more devices that enable a user to interact with the electronic device 500, and/or communicate with any device (such as a router or a modem) that enables the electronic device 500 to communicate with one or more other computing devices. Such communication may be performed through an input/output (I/O) interface 550. Moreover, the electronic device 500 may also communicate with one or more networks (such as a local area network (LAN), a wide area network (WAN), and/or a public network such as the Internet) through a network adapter 560. As shown in the figure, the network adapter 560 may communicate with other modules of the electronic device 500 through the bus 530. It should be understood that although not shown in the figure, other hardware and/or software modules may be used in combination with the electronic device 500, including, but not limited to, microcode, a device driver, a redundancy processing unit, an external disk drive array, a redundant array of independent disks (RAID) system, a tape drive, a data backup storage system, and the like.

According to the foregoing descriptions of the implementations, a person skilled in the art may readily understand that the exemplary implementations described herein may be implemented by using software or by combining software and necessary hardware. Therefore, the technical solutions of the implementations of the present disclosure may be implemented in the form of a software product. The software product may be stored in a non-volatile storage medium (which may be a CD-ROM, a USB flash drive, a removable hard disk, or the like) or in a network and includes several instructions for instructing a computer device (which may be a personal computer, a server, a terminal device, a network device, or the like) to perform the method described in the implementations of the present disclosure.

In an exemplary embodiment of the present disclosure, a computer-readable storage medium is further provided, a program product capable of implementing the foregoing method of this specification being stored thereon. In some possible implementations, each aspect of the present invention may be further implemented in the form of a program product including program code. When the program product runs on a terminal device, the program code is used to enable the terminal device to perform the steps according to the exemplary implementations of the present invention described in the foregoing "exemplary method" part of this specification.

Figure 15:
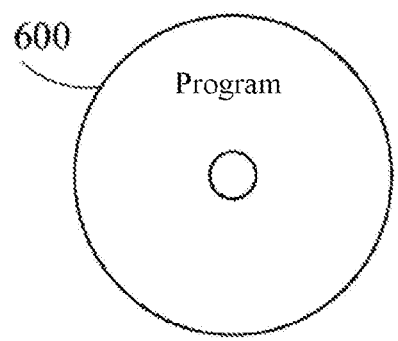
FIG. 15 schematically shows a computer-readable storage medium for implementing the splicing screen image display method.

FIG. 15 describes a program product 600 used to implement the foregoing method according to an implementation of the present invention, and the program product 600 may adopt a portable CD-ROM and include program code, and may run on a terminal device, such as a personal computer. However, the program product in the present invention is not limited thereto. In this specification, the readable storage medium may be any tangible medium including or storing a program, and the program may be used by or used in combination with an instruction execution system, an apparatus, or a device.

The program product may be any combination of one or more readable mediums. The readable medium may be a computer-readable signal medium or a computer-readable storage medium. The readable storage medium may be, for example, but is not limited to, an electric, magnetic, optical, electromagnetic, infrared, or semi-conductive system, apparatus, or device, or any combination thereof. More specific examples (a non-exhaustive list) of the readable storage medium may include: an electrical connection having one or more wires, a portable disk, a hard disk, a RAM, a ROM, an erasable programmable ROM (EPROM or flash memory), an optical fiber, a portable CD-ROM, an optical storage device, a magnetic storage device, or any appropriate combination thereof.

The computer-readable signal medium may include a data signal being in a baseband or transmitted as a part of a carrier, which carries readable program code. The propagated data signal may be in a plurality of forms, including, but not limited to, an electromagnetic signal, an optical signal, or any appropriate combination thereof. The readable signal medium may alternatively be any readable medium other than the readable storage medium. The readable medium may be used to send, propagate, or transmit a program used by or in combination with an instruction execution system, an apparatus, or a device.

The program code included in the readable medium may be transmitted by using any suitable medium, including, but not limited to, a wireless medium, a wired medium, an optical cable, radio frequency (RF), or any appropriate combination thereof.

The program code used for executing the operations of the present invention may be written by using one or more programming languages or a combination thereof. The programming languages include an object-oriented programming language such as Java and C++, and also include a conventional procedural programming language such as "C" or similar programming languages. The program code may be completely executed on a user computing device, partially executed on a user device, executed as an independent software package, partially executed on a user computing device and partially executed on a remote computing device, or completely executed on a remote computing device or server. In a case involving a remote computing device, the remote computing device may be connected to a user computing device through any type of network including a LAN or a WAN, or may be connected to an external computing device (for example, through the Internet by using an Internet service provider).

In addition, the foregoing accompanying drawings are only schematic illustrations of the processes included in the method according to the exemplary embodiments of the present invention, and are not intended for limiting. It is easily understood that the processes illustrated in the foregoing accompanying drawings do not indicate or define the chronological order of these processes. In addition, it is also easily understood that these processes may be performed, for example, synchronously or asynchronously in a plurality of modules. A display apparatus and a display panel thereof provided in the embodiments of the present disclosure are described in detail above. The principles and implementations of the present disclosure are described through specific examples in this specification, and the descriptions of the embodiments are only intended to help understand the method and core ideas of the present disclosure. In addition, a person skilled in the art may make modifications to the specific implementations and application scopes according to the ideas of the present disclosure. In conclusion, the content of this specification should not be construed as a limitation to the present disclosure.

What is claimed is:

1. A splicing screen image display method, applicable to a splicing screen device, wherein the splicing screen device comprises a plurality of display modules, the plurality of display modules comprise at least two basic display modules and at least one supplementary display module disposed at a seam between the at least two basic display modules, and the splicing screen image display method comprises:
    obtaining a source image and resolution information of the splicing screen device, wherein the resolution information comprises pixel widths of the supplementary display modules, and the pixel widths are pixel sizes of the supplementary display modules in a width direction of the seam;
    adding frame display areas to outer edges of the source image, to form a target image corresponding to a resolution of the splicing screen device, wherein the frame display areas are parallel to the seam, and a sum of pixel widths of the frame display areas that are parallel to each other is equal to a sum of the pixel widths of the supplementary display modules that are parallel to each other; and
    sending the target image to the basic display modules and the supplementary display modules, to display the target image.

2. The splicing screen image display method as claimed in claim 1, wherein the adding frame display areas to outer edges of the source image, to form a target image corresponding to a resolution of the splicing screen device further comprises:
    segmenting the source image into a plurality of display sub-images; and
    adding frame display subareas to outer edges of the display sub-images located on outermost sides, to form target sub-images, wherein the frame display subareas are parallel to the seam, and a sum of pixel widths of the frame display subareas that are parallel to each other is equal to the sum of the pixel widths of the supplementary display modules that are parallel to each other, the frame display subareas jointly form the frame display area, and the target sub-images jointly form the target image.

3. The splicing screen image display method as claimed in claim 2, wherein the resolution information further comprises resolutions of the basic display modules, and the segmenting the source image into a plurality of display sub-images further comprises:

segmenting the source image into a plurality of initial basic sub-images according to the resolutions of the basic display modules; and cropping the initial basic sub-images, to form a supplementary display sub-image close to the seam and a basic display sub-image away from the seam, wherein a pixel width of the supplementary display sub-image is not greater than the pixel width of the supplementary display module, and the supplementary display sub-image and the basic display sub-image jointly form the display sub-image.

4. The splicing screen image display method as claimed in claim 3, wherein the adding frame display subareas to outer edges of the display sub-images located on outermost sides, to form target sub-images further comprises:

adding frame display subareas along outer edges of the basic display sub-image, to form target basic sub-images, wherein the frame display subareas are parallel to the seam, and the pixel widths of the frame display subareas are equal to the pixel width of the supplementary display sub-image; and adding frame display subareas to outer edges of the supplementary display sub-image, to form target supplementary sub-images, for the target supplementary sub-images to be flush with outer edges of the basic sub-images, wherein the frame display subareas jointly form the frame display area, and the target supplementary sub-images and the target basic sub-images jointly form the target image.

5. The splicing screen image display method as claimed in claim 2, wherein the resolution information further comprises resolutions of the display modules, and the segmenting the source image into a plurality of display sub-images further comprises:

segmenting the source image into display sub-images corresponding to the display modules according to the resolutions of the display modules; and the adding frame display subareas to outer edges of the display sub-images located on outermost sides, to form target sub-images further comprises:

adding the frame display subareas to the outer edges of the display sub-images located on the outermost sides, to form the target sub-images corresponding to the display modules, wherein the target sub-images comprise a target basic sub-image corresponding to the basic display module and a target supplementary sub-image corresponding to the supplementary display module.

6. The splicing screen image display method as claimed in claim 1, wherein the adding frame display areas to outer edges of the source image, to form a target image corresponding to a resolution of the splicing screen device further comprises:

adding the frame display areas to the outer edges of the source image, to form a matching image corresponding to the resolution of the splicing screen device, wherein the frame display areas are parallel to the seam; and segmenting the matching image into target supplementary sub-images corresponding to the supplementary display modules and target basic sub-images corresponding to the basic display modules, wherein the target supplementary sub-images and the target basic sub-images jointly form the target image.

7. The splicing screen image display method as claimed in claim 4, wherein the sending the target image to the basic display modules and the supplementary display modules, to display the target image further comprises:

sending the target supplementary sub-images to the supplementary display modules, to display the target supplementary sub-images; and sending the target basic sub-images to the basic display modules, to display the target basic sub-images.

8. The splicing screen image display method as claimed in claim 1, wherein the frame display area is used for displaying a decorative frame.

9. A splicing screen image display apparatus, installed in a splicing screen device, wherein the splicing screen device comprises a plurality of display modules, the plurality of display modules comprise at least two basic display modules and at least one supplementary display module disposed at a seam between the at least two basic display modules, and the splicing screen image display apparatus comprises:

an obtaining unit, configured to obtain a source image and resolution information of the splicing screen device, wherein the resolution information comprises pixel widths of the supplementary display modules, and the pixel widths are pixel sizes of the supplementary display modules in a width direction of the seam;

a processing unit, configured to add frame display areas to outer edges of the source image, to form a target image corresponding to a resolution of the splicing screen device, wherein the frame display areas are parallel to the seam, and a sum of pixel widths of the frame display areas that are parallel to each other is equal to a sum of the pixel widths of the supplementary display modules that are parallel to each other; and a display unit, configured to send the target image to the basic display modules and the supplementary display modules, to display the target image.

10. The splicing screen image display apparatus as claimed in claim 9, wherein the processing unit is further configured to:

segment the source image into a plurality of display sub-images; and add frame display subareas to outer edges of the display sub-images located on outermost sides, to form target sub-images, wherein the frame display subareas are parallel to the seam, and a sum of pixel widths of the frame display subareas that are parallel to each other is equal to the sum of the pixel widths of the supplementary display modules that are parallel to each other, the frame display subareas jointly form the frame display area, and the target sub-images jointly form the target image.

11. The splicing screen image display apparatus as claimed in claim 10, wherein the resolution information further comprises resolutions of the basic display modules, and the segmenting the source image into a plurality of display sub-images further comprises:

segmenting the source image into a plurality of initial basic sub-images according to the resolutions of the basic display modules; and cropping the initial basic sub-images, to form a supplementary display sub-image close to the seam and a basic display sub-image away from the seam, wherein a pixel width of the supplementary display sub-image is not greater than the pixel width of the supplementary display module, and the supplementary display sub-image and the basic display sub-image jointly form the display sub-image.

12. The splicing screen image display apparatus as claimed in claim 11, wherein the adding frame display subareas to outer edges of the display sub-images located on outermost sides, to form target sub-images further comprises:
adding frame display subareas along outer edges of the basic display sub-image, to form target basic sub-images, wherein the frame display subareas are parallel to the seam, and the pixel widths of the frame display subareas are equal to the pixel width of the supplementary display sub-image; and
adding frame display subareas to outer edges of the supplementary display sub-image, to form target supplementary sub-images, for the target supplementary sub-images to be flush with outer edges of the basic sub-images, wherein the frame display subareas jointly form the frame display area, and the target supplementary sub-images and the target basic sub-images jointly form the target image.

13. The splicing screen image display apparatus as claimed in claim 10, wherein the resolution information further comprises resolutions of the display modules, and the segmenting the source image into a plurality of display sub-images further comprises:
segmenting the source image into display sub-images corresponding to the display modules according to the resolutions of the display modules; and
the adding frame display subareas to outer edges of the display sub-images located on outermost sides, to form target sub-images further comprises:
adding the frame display subareas to the outer edges of the display sub-images located on the outermost sides, to form the target sub-images corresponding to the display modules, wherein
the target sub-images comprise a target basic sub-image corresponding to the basic display module and a target supplementary sub-image corresponding to the supplementary display module.

14. The splicing screen image display apparatus as claimed in claim 9, wherein the processing unit is further configured to:
add the frame display areas to the outer edges of the source image, to form a matching image corresponding to the resolution of the splicing screen device, wherein the frame display areas are parallel to the seam; and
segment the matching image into target supplementary sub-images corresponding to the supplementary display modules and target basic sub-images corresponding to the basic display modules, wherein the target supplementary sub-images and the target basic sub-images jointly form the target image.

15. The splicing screen image display apparatus as claimed in claim 12, wherein the display unit is further configured to:
send the target supplementary sub-images to the supplementary display modules, to display the target supplementary sub-images; and
send the target basic sub-images to the basic display modules, to display the target basic sub-images.

16. A computer device, comprising:
one or more processors;
a memory; and
one or more application programs, wherein the one or more application programs are stored in the memory and configured to be executed by the one or more processors, to perform steps of:
obtaining a source image and resolution information of the splicing screen device, wherein the resolution information comprises pixel widths of the supplementary display modules, and the pixel widths are pixel sizes of the supplementary display modules in a width direction of the seam;
adding frame display areas to outer edges of the source image, to form a target image corresponding to a resolution of the splicing screen device, wherein the frame display areas are parallel to the seam, and a sum of pixel widths of the frame display areas that are parallel to each other is equal to a sum of the pixel widths of the supplementary display modules that are parallel to each other; and
sending the target image to the basic display modules and the supplementary display modules, to display the target image.

17. The computer device as claimed in claim 16, wherein in the step of adding frame display areas to outer edges of the source image, to form a target image corresponding to a resolution of the splicing screen device, the processor performs steps of:
segmenting the source image into a plurality of display sub-images; and
adding frame display subareas to outer edges of the display sub-images located on outermost sides, to form target sub-images, wherein the frame display subareas are parallel to the seam, and a sum of pixel widths of the frame display subareas that are parallel to each other is equal to the sum of the pixel widths of the supplementary display modules that are parallel to each other, the frame display subareas jointly form the frame display area, and the target sub-images jointly form the target image.

18. The computer device as claimed in claim 17, wherein the resolution information further comprises resolutions of the basic display modules, and in the step of segmenting the source image into a plurality of display sub-images, the processor performs steps of:
segmenting the source image into a plurality of initial basic sub-images according to the resolutions of the basic display modules; and
cropping the initial basic sub-images, to form a supplementary display sub-image close to the seam and a basic display sub-image away from the seam, wherein a pixel width of the supplementary display sub-image is not greater than the pixel width of the supplementary display module, and the supplementary display sub-image and the basic display sub-image jointly form the display sub-image.

19. The computer device as claimed in claim 18, wherein in the step of adding frame display subareas to outer edges of the display sub-images located on outermost sides, to form target sub-images, the processor performs steps of:
adding frame display subareas along outer edges of the basic display sub-image, to form target basic sub-images, wherein the frame display subareas are parallel to the seam, and the pixel widths of the frame display subareas are equal to the pixel width of the supplementary display sub-image; and
adding frame display subareas to outer edges of the supplementary display sub-image, to form target supplementary sub-images, for the target supplementary sub-images to be flush with outer edges of the basic sub-images, wherein the frame display subareas jointly form the frame display area, and the target supplementary sub-images and the target basic sub-images jointly form the target image.

20. The computer device as claimed in claim 17, wherein the resolution information further comprises resolutions of the display modules, and in the step of segmenting the source image into a plurality of display sub-images, the processor performs steps of:
 segmenting the source image into display sub-images corresponding to the display modules according to the resolutions of the display modules; and
 the adding frame display subareas to outer edges of the display sub-images located on outermost sides, to form target sub-images further comprises:
 adding the frame display subareas to the outer edges of the display sub-images located on the outermost sides, to form the target sub-images corresponding to the display modules, wherein
 the target sub-images comprise a target basic sub-image corresponding to the basic display module and a target supplementary sub-image corresponding to the supplementary display module.

* * * * *